UNITED STATES PATENT OFFICE.

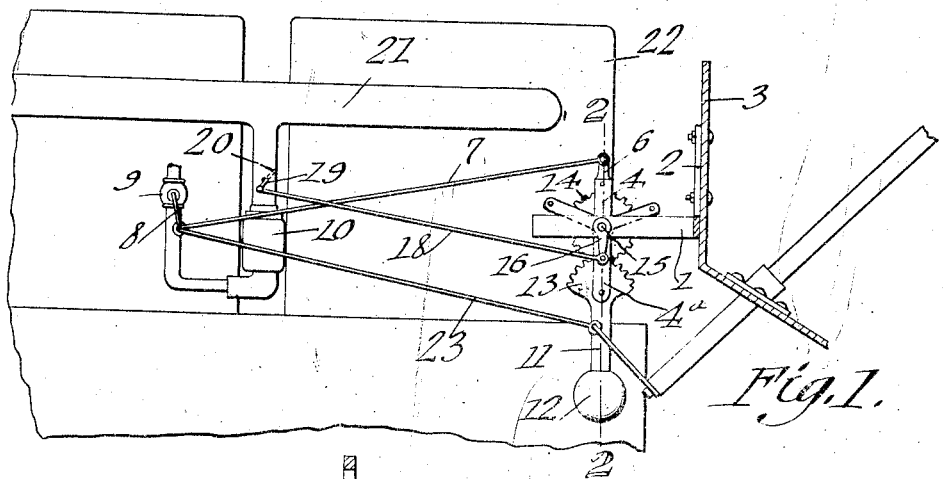

GUY A. LEMON, OF CHAPMAN, KANSAS.

CARBURETER.

1,186,588.  Specification of Letters Patent.  Patented June 13, 1916.

Application filed July 28, 1915. Serial No. 42,385.

*To all whom it may concern:*

Be it known that I, GUY A. LEMON, a citizen of the United States, residing at Chapman, in the county of Dickinson and State of Kansas, have invented a new and useful Automatic Carbureter Control for Automobiles, of which the following is a specification.

This invention is a mechanism for automatically controlling the carbureter of an automobile or motor vehicle, whereby the supply of fuel to the engine is increased and diminished, respectively, when the car ascends and descends hills, so that the speed of the car is maintained uniform on inclined as well as level roads, without special attention of the operator or driver being necessary.

It is the object of the invention to provide a device of the nature indicated, which is simple, compact and inexpensive in construction, which may be readily applied to various motor vehicles, and which will serve its office in a thoroughly practical and efficient manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein:—

Figure 1 is an elevation of the device as applied. Fig. 2 is an enlarged vertical section of the device taken on the line 2—2 of Fig. 1.

In carrying out the invention there is provided a horizontal loop-shaped bracket or frame 1 provided at one end with a plate 2 which may be conveniently attached to the dash 3 of the vehicle, to hold the device under the hood (not shown). A swinging frame 4, embodying side plates having lower depending terminals 4ᵃ, is supported by the bracket 1 between the side bars of the bracket, the side bars of the bracket having inwardly projecting bosses 5 upon which the side plates of the frame 4 are journaled for oscillation. The frame 4 has an upwardly projecting terminal 6 to which one end of a rod or link 7 is pivoted, and the other end of said rod is pivoted to the operating arm 8 of the valve 9 controlling the flow of gasolene or fuel into the carbureter 10. The parts are so arranged, that when the vehicle is on a level road, the bracket 1 being horizontal with the frame 4 disposed at right angles therewith, the fuel controlling valve 9 will be held partially open, between its open and closed positions, whereby the movement of the frame 4 in opposite directions will serve to move the valve 9 further opened or closed, whichever is the case.

A pendulum 11 is pivoted between the lower terminals 4ᵃ of the frame 4 and is provided at its lower end with a weight 12, while the upper or pivoted end of the pendulum 11 is provided with a gear segment 13 meshing with a gear wheel 14 disposed within the frame 4 and keyed upon a shaft 15 journaled through the bosses or bearings 5. An arm 16 is secured to one end of the shaft 15 and has one end of a rod or link 18 pivotally connected thereto, while the other end of the rod 18 is pivotally connected to the operating arm 19 of the gas controlling valve 20 which controls the flow of carbureted air from the carbureter 10 into the intake manifold 21 of the engine 22.

The valves 9 and 20 are of ordinary construction, and the valve 9 is connected, as at 23, to the controlling means of the steering post. The present attachment may be readily applied to the machine and operatively connected with the valves 9 and 20. When the car is on a level road, both of the valves 9 and 20 are held partially open.

In operation, when the car or vehicle is traveling along a level road, the weighted pendulum 11 will hold the frame 4 at such position, that the valve 9 will be held partially open for properly admitting the fuel to the carbureter, and the segment 13 meshing with the gear 14 will hold the arm 16 at such position, as to hold the butterfly valve 20 partially open. The machine will therefore run as usual. Supposing now, that the vehicle starts to ascend a hill, the vehicle will naturally be inclined, bringing the bracket 1 to an inclined position. The weighted pendulum 11, however, will not swing with the bracket 1, but will swing rearwardly relative to a vehicle to a pendant position, carrying with it the frame 4, so that the upper terminal 6 of the frame is moved forwardly relative to the bracket 1, and this will open the valve 9 farther, for admitting more fuel to the carbureter. When the pendulum 11 is swung rearwardly, as specified, the segment 13 thereof engaging the gear 14 will rotate the shaft 15 relative to the bracket 1, so that the arm 16 will be swung relative to the bracket 1 for opening the butterfly valve 20 farther, and this allows more gas to enter the engine cylinders. Consequently, the power is increased, in order that the speed of the vehicle will not be retarded while traveling up the hill. Conversely, when the vehicle is descending a hill, the pendulum 11 will swing forwardly relative to the bracket 1 whereby the terminal 6 and gear wheel 14 are moved in the opposite direction from that above indicated, for moving the valves 9 and 20 toward closed positions. This shuts off the supply of gas to the engine, for decreasing the power, so as to maintain the normal speed of the vehicle. With the present mechanism, therefore, the speed of the vehicle will be regular when the vehicle is ascending and descending hills as well as traveling upon a level road, and the operation is entirely automatic so as not to necessitate the attention of the operator.

It is desirable to have the pendulum 11 pivoted to the oscillatory frame 4, whereby the frame 4 will not be swung needlessly by every slight vibration of the pendulum 11, as would continuously disturb the flow of fuel to the carbureter, but the gear connection between the pendulum and the gas controlling valve 20 causes said valve to be operated properly and effectively by the movements of the pendulum.

Having thus described the invention, what is claimed as new is:—

1. In a device of the character described, an oscillatory frame, means for operatively connecting it with a fuel controlling valve, a shaft, means for operatively connecting the shaft with a gas controlling valve, a weighted pendulum pivoted to the frame whereby it tends to remain in one position, and an operative connection between said pendulum and shaft.

2. In a device of the character described, an oscillatory frame, means for operatively connecting it with a fuel controlling valve, a shaft, means for operatively connecting the shaft with a gas controlling valve, a weighted pendulum pivoted to the frame and having a gear segment, and a gear wheel keyed upon said shaft and meshing with said segment.

3. In a device of the character described, a bracket attachable to a motor vehicle, a frame mounted for oscillation within said bracket, means for operatively connecting said frame with the fuel control valve of the vehicle, a shaft journaled through said bracket, means for operatively connecting said shaft and the gas controlling valve of the vehicle, a pendulum pivoted to the lower portion of the frame and having a weight and a gear segment at its upper end, and a gear wheel keyed upon said shaft within the frame and meshing with said segment.

In testimony that I claim the foregoing as my own, I have hereto affixed my signature in the presence of two witnesses.

GUY A. LEMON.

Witnesses:
H. E. LEATHERMAN,
C. M. CLARK.